US012587031B2

(12) United States Patent
Otsuji et al.

(10) Patent No.: US 12,587,031 B2
(45) Date of Patent: Mar. 24, 2026

(54) NETWORK SYSTEM AND CONFIGURATION METHOD OF NETWORK ARCHITECTURE

(71) Applicants: TOHOKU UNIVERSITY, Sendai (JP); FURUKAWA ELECTRIC CO., LTD., Tokyo (JP)

(72) Inventors: Taiichi Otsuji, Miyagi (JP); Katsumi Iwatsuki, Miyagi (JP); Hirohito Yamada, Miyagi (JP); Masafumi Yashima, Miyagi (JP); Masakazu Matsui, Tokyo (JP); Hiroyuki Koshi, Tokyo (JP)

(73) Assignees: TOHOKU UNIVERSITY, Sendai (JP); FURUKAWA ELECTRIC CO., LTD., Tokyo (JP)

( * ) Notice: Subject to any disclaimer, the term of this patent is extended or adjusted under 35 U.S.C. 154(b) by 359 days.

(21) Appl. No.: 18/344,183

(22) Filed: Jun. 29, 2023

(65) Prior Publication Data

US 2023/0344269 A1 Oct. 26, 2023

Related U.S. Application Data

(63) Continuation of application No. PCT/JP2021/047922, filed on Dec. 23, 2021.

(30) Foreign Application Priority Data

Jan. 4, 2021 (JP) ................................. 2021-000156

(51) Int. Cl.
*H02J 13/00* (2006.01)
*H02J 3/38* (2006.01)

(52) U.S. Cl.
CPC .......... *H02J 13/00007* (2020.01); *H02J 3/38* (2013.01)

(58) Field of Classification Search
None
See application file for complete search history.

(56) References Cited

U.S. PATENT DOCUMENTS 10,366,459 B2 7/2019 Sadikovic
10,791,020 B2 9/2020 Foster et al.
(Continued)

FOREIGN PATENT DOCUMENTS

JP 2012-68947 A 4/2012
JP 2020-43629 A 3/2020
(Continued)

OTHER PUBLICATIONS

Extended European Search Report issued Feb. 28, 2025 in European Patent Application No. 21915201.4, 8 pgs.
(Continued)

*Primary Examiner* — Ryan A Jarrett
(74) *Attorney, Agent, or Firm* — Oblon, McClelland, Maier & Neustadt, L.L.P.

(57) ABSTRACT

A network system includes a network architecture including: a network layer configured to define an entirety of an electric power network constituted from electric power grids; a local network layer configured to define a local network corresponding to electric power grid groups and forming a part of the electric power network; a grid layer configured to define the electric power grids; a physical layer configured to define constituent elements included in the electric power grids; a first layer configured to define the information communication network that is associated with the network layer; a second layer configured to define the information communication network that is associated with the local network layer; a third layer configured to define the information communication network that is associated with the grid layer; and space, a fourth layer configured to define the (Continued)

information communication network that is associated with the physical layer.

10 Claims, 4 Drawing Sheets

(56)                    References Cited

U.S. PATENT DOCUMENTS

| | | |
|---|---|---|
| 2011/0109266 A1 | 5/2011 | Rossi |
| 2012/0310434 A1 | 12/2012 | Taft |
| 2013/0310952 A1 | 11/2013 | Matsuda et al. |
| 2014/0277787 A1* | 9/2014 | Forbes, Jr. ........ H02J 13/00016 |
| | | 700/286 |
| 2016/0276830 A1 | 9/2016 | Nasirian et al. |
| 2017/0003669 A1 | 1/2017 | Matsuda et al. |
| 2017/0364052 A1 | 12/2017 | Matsuda et al. |
| 2020/0293960 A1 | 9/2020 | Weaver et al. |

FOREIGN PATENT DOCUMENTS

| | | |
|---|---|---|
| WO | WO 2013/172088 A1 | 11/2013 |
| WO | WO 2015/159682 A1 | 10/2015 |

OTHER PUBLICATIONS

International Search Report issued Feb. 15, 2022 in PCT/JP2021/047922 filed on Dec. 23, 2021, 2 pages.

* cited by examiner

ELECTRIC POWER ELEMENT

11
DETECTION UNIT

12
CONTROL UNIT

13
STORAGE UNIT

14
COMMUNICA-TION UNIT

15
ELECTRIC POWER CON-VERSION UNIT 31-1

10
ELECTRIC POWER ELEMENT

10
ELECTRIC POWER ELEMENT

20

10
ELECTRIC POWER ELEMENT

10
ELECTRIC POWER ELEMENT

5

31-2
DIRECT CURRENT GRID 11-1

11a
CONTROL UNIT

11b
STORAGE UNIT

11c
COMMUNICA-TION UNIT

NETWORK SYSTEM AND CONFIGURATION METHOD OF NETWORK ARCHITECTURE

This application is a continuation of International Application No. PCT/JP2021/047922, filed on Dec. 23, 2021 which claims the benefit of priority of the prior Japanese Patent Applications No. 2021-000156, filed on Jan. 4, 2021, the entire contents of which are incorporated herein by reference.

BACKGROUND

The present disclosure relates a network system and a configuration method of a network architecture.

A smart city and a compact city that implement Society 5.0, in which cyberspace and physical space in a cyber physical system (CPS) are highly integrated, implement efficiency and sophistication of functions and services held by cities and regions, and are expected to be able to satisfy compatibility between solutions for goals, such as decarbonization, to be challenged by a society and economic development due to a reform of industrial structures caused by digital transformation or the like.

The number of Renewable Energy 100% (RE100) members of companies committed to perform business operations by using only renewable energy is increased as a result of an increase in investment (ESG investment) in consideration of three elements of Environment, Social, and Governance; adoption "the 2030 Agenda for Sustainable Development" (Sustainable Development Goals (SDGs)) accepted at the United Nations Summit held in September 2015; and the like.

A smart city market in the world is estimated to reach the scale of a cumulative amount of 3,100 trillion yen in two decades between 2010 and 2030, and, in an energy-related market that becomes a key part of the smart city market, a market size is expected to be about 720 trillion yen related to a smart grid, about 310 trillion yen related to a next generation automobile, such as an Electric Vehicle (EV), and about 380 trillion yen related to a renewable energy. Accordingly, a smart city implementation plan is promoted in many countries and regions, and a part of the plan has already started to be implemented.

In International Publication Pamphlet No. WO 2013/172088 described below, a system constituted by connecting a distributed power supply including solar photovoltaic power generation, wind power generation, a storage battery, and an electric power storage system for electric power; a social infrastructure including EVs and charging stations; a home energy management system (HEMS) and a building energy management system (BEMS); and an electric power plant with each other by using communication grids and electric power grids is proposed. In particular, in International Publication Pamphlet No. WO 2013/172088, a social infrastructure control system that performs overall control of the social infrastructure using a Smart Community Management System (SCMS) by connecting various kinds of infrastructures to a cloud computing system via an optical communication network is proposed.

SUMMARY

In an electric power network of an electric power system or the like and an information communication network that correspond to an existing large-scale social infrastructure system, centralized control is performed on the system operation of the network, so that the network is vulnerable to a natural disaster or the like and the magnitude of the damage tends to be increased; therefore, there is a concern about a prolonged period of recovery. In CPS that implements Society 5.0, by integrating the foundations of the electric power network and the information communication network that are needed to highly integrate the cyberspace with the physical space, resilience of both networks is desired to be strengthened.

Accordingly, there is a need for a network system, in which an electric power network and an information communication network are more highly integrated and resilience is strengthened, and to provide a configuration method of a network architecture.

According to one aspect of the present disclosure, there is provided a network system including a network architecture in which an information communication network and an electric power network are defined in physical space and cyberspace, wherein the network architecture includes: in the cyberspace, a network layer configured to define an entirety of the electric power network that is constituted from a plurality of electric power grids; in the cyberspace, a local network layer configured to define a local network that corresponds to a plurality of electric power grid groups and that forms a part of the electric power network; in the physical space, a grid layer configured to define the electric power grids; in the physical space, a physical layer configured to define constituent elements included in the electric power grids; in the cyberspace, a first layer configured to define the information communication network that is associated with the network layer; in the cyberspace, a second layer configured to define the information communication network that is associated with the local network layer; in the physical space, a third layer configured to define the information communication network that is associated with the grid layer; and in the physical space, a fourth layer configured to define the information communication network that is associated with the physical layer.

According to another aspect of the present disclosure, there is provided a configuration method of a network architecture in which an electric power network and an information communication network are defined in physical space and cyberspace and in which electric power is integrated with a network of information communication, the configuration method of the network architecture including: defining, in the cyberspace, a network layer configured to define an entirety of the electric power network that is constituted from a plurality of electric power grids; defining, in the cyberspace, a local network layer configured to define a local network that corresponds to a plurality of electric power grid groups and that forms a part of the electric power network; defining, in the physical space, a grid layer configured to define the electric power grids; defining, in the physical space, a physical layer configured to define constituent elements included in the electric power grids; defining, in the cyberspace, a first layer configured to define the information communication network in an associated manner with the network layer; defining, in the cyberspace, a second layer configured to define the information communication network in an associated manner with the local network layer; defining, in the physical space, a third layer configured to define the information communication network in an associated manner with the grid layer; and defining, in the physical space, a fourth layer configured to define the information communication network in an associated manner with the physical layer.

BRIEF DESCRIPTION OF THE DRAWINGS

FIG. 3 is a diagram illustrating one example of a configuration of the network system having the network architecture according to the embodiment;

DETAILED DESCRIPTION

Figure 1:
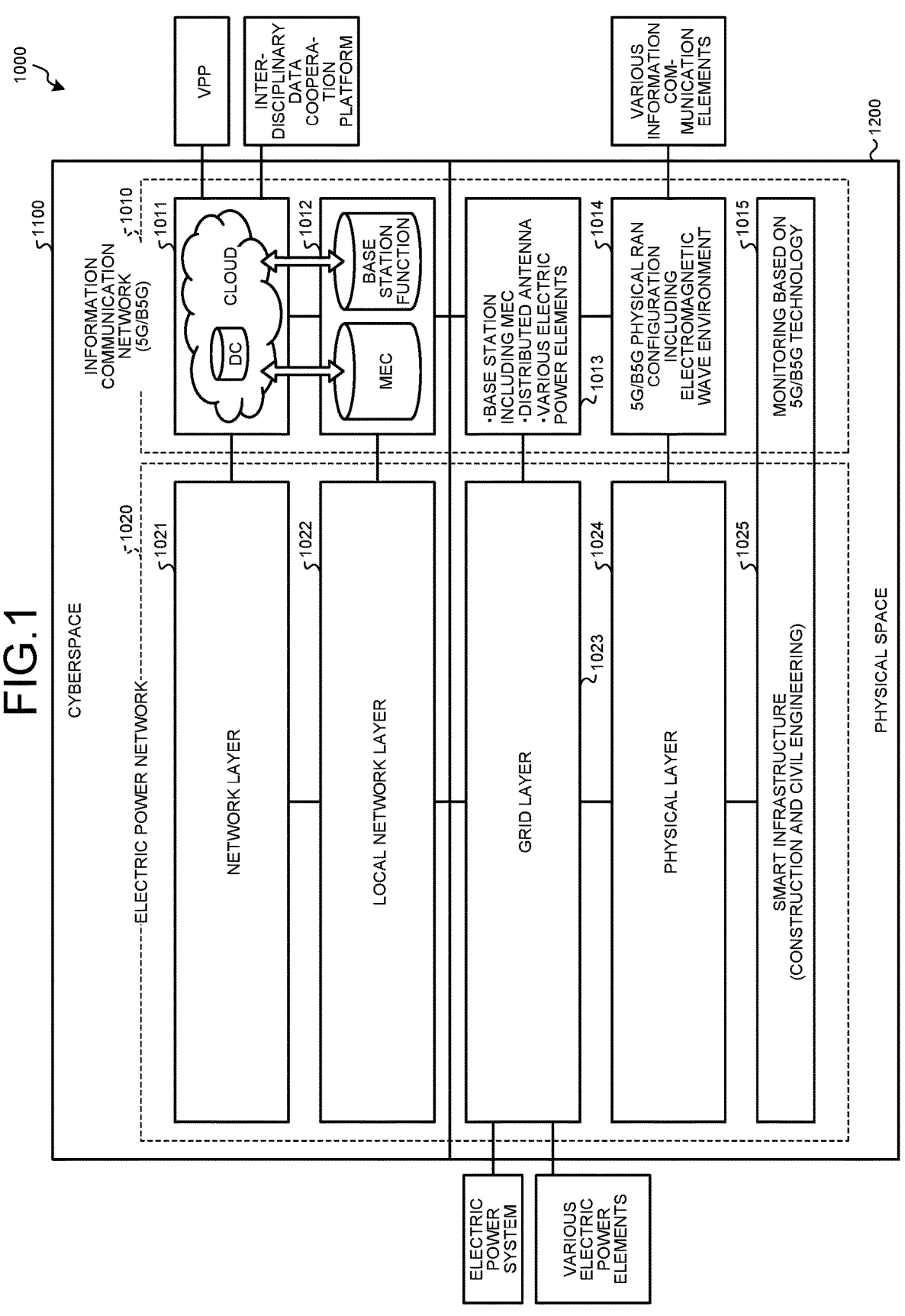
FIG. 1 is a diagram illustrating a configuration of a network architecture according to an embodiment.

An embodiment of the present disclosure will be described below with reference to the drawings. Furthermore, the present disclosure is not limited to the embodiment described below. In addition, in each of the drawings, the same reference numerals will be assigned to constituent elements that are the same or corresponding to each other, as appropriate.

FIG. 1 is a diagram illustrating a configuration of a network architecture according to an embodiment. A network architecture 1000 models an information communication network 1010 and an electric power network 1020 that are defined in cyberspace 1100 and physical space 1200. In addition, in the present embodiment, the communication standard of information communication is the fifth generation mobile communication system (5G) or Beyond (B) 5G. Furthermore, 5G has a characteristic of "ultrahigh speed", "ultra-low delay", and "multiple simultaneous connections". Regarding the "ultra-low delay", for example, about 1 millisecond or less is guaranteed as communication delay time. B5G is a mobile communication system used in the next generation of 5G.

In the modeling as described above, regarding the electric power network 1020, the network architecture 1000 includes a network layer 1021, a local network layer 1022, a grid layer 1023, a physical layer 1024, and a lower level layer 1025. Among these layers, predetermined protocols and interfaces are defined, and then, these layers are connected.

The local network layer 1022 defines a local network that corresponds to a plurality of electric power grid groups and that forms a part of the electric power network. Each of the electric power grid groups includes a plurality of electric power grids. The electric power grids are elements constituting the electric power network 1020 and has a topology of a bus type, a star type, a ring type, or a mesh type. Each of the grids are constituted by electric power elements. In this definition, a definition related to autonomous distributed cooperative control about, for example, supply and demand or an interchange of electric power is included. The autonomous distributed cooperative control will be described later.

The network layer 1021 defines the entirety of the electric power network 1020 that is formed by the plurality of local networks. The electric power network 1020 is constituted from the plurality of electric power grids. In this definition, a definition related to centralized control about, for example, supply and demand or an interchange of electric power is included. The centralized control will be described later.

The grid layer 1023 defines the electric power grids. The grid layer 1023 defines at least one of a topology of the electric power grids, connections between grids and the electric power elements constituting the electric power grids, an energy management system (EMS) for the electric power grids, cooperation with an electric power system, and a connection between the electric power grids. Here, in the present embodiment, the electric power grids is a grid having a topology of a bus type, a star type, a ring type, or a mesh type, and is sometimes referred to as a direct current grid as needed.

The physical layer 1024 defines the constituent elements of the electric power grids. The physical layer 1024 defines the function and the performance of, for example, generated electric power, feed power, stored electric power, and electric power consumption of each of the electric power elements constituting the direct current grid. In this definition, for example, a definition of the function or the performance of at least one of an electric power generating device or an electric power storage device serving as the electric power element constituting the electric power grid, an electric power converter, and a direct current base line, and a definition of a connection between each of the electric power grids and the electric power system are included.

The lower level layer 1025 defines a smart infrastructure. The smart infrastructure mentioned here is a facility in which the constituent elements of the electric power network 1020 and the constituent elements of the information communication network 1010 are provided, or an element related to construction of a cable tunnel or the like or an element related to civil engineering.

In the modeling as described above, regarding the information communication network 1010, the network architecture 1000 includes a first layer 1011, a second layer 1012, a third layer 1013, a fourth layer 1014, and a fifth layer 1015. A predetermined protocol and an interface are defined between these layers, and then, these layers are connected.

The second layer 1012 defines the information communication network 1010 that is associated with the local network layer 1022. In this definition, a definition between, for example, Mobile Edge Computing (MEC) and a function of a wireless base station is included. In addition, in the cyberspace 1100, a predetermined protocol and an interface are defined between the second layer 1012 and the local network layer 1022, and then, the second layer 1012 and the local network layer 1022 are connected.

The first layer 1011 defines the information communication network 1010 that is associated with the network layer 1021. In this definition, a definition of the cloud computing including, for example, a cloud server that is installed in a data center is included. In addition, in the cyberspace 1100, a predetermined protocol and an interface are defined between the first layer 1011 and the network layer 1021, and then, the first layer 1011 and the network layer 1021 are connected.

The third layer 1013 defines the information communication network 1010 that is associated with the grid layer 1023. In this definition, a definition about a wireless base station including the MEC that constitutes, for example, the information communication network 1010 and a definition of a topology of a distributed antenna are included. Each of the wireless base station including the MEC and the distributed antenna is an electric power element that is needed to receive electric power, and receives electric power supply and demand from the local network layer 1022 described above. In addition, in the physical space 1200, a predetermined protocol and an interface are defined between the third layer 1013 and the grid layer 1023, and then, the third layer 1013 and the grid layer 1023 are connected.

The fourth layer 1014 defines the information communication network 1010 that is associated with the physical layer 1024. In this definition, a definition about a physical radio access network (RAN) configuration including, for example, an electromagnetic wave environment in the information communication network 1010 is included. In addition, the electromagnetic wave environment mentioned here is an electromagnetic wave environment related to availability of communication establishment between a transmission device and a reception device in the case where, for example, electromagnetic waves used for information communication is affected by a shielding object or the like.

The fifth layer 1015 defines the information communication network 1010 that is associated with the lower level layer 1025. In this definition, a definition about monitoring of a smart infrastructure performed by using, for example, the 5G/B5G technology.

In addition, various kinds of information communication elements, such as a data center, a Vehicle to Network (V2N), a terminal for wireless information communication including a smartphone, a smart device including smart glass, or the like, that are associated with the 5G/B5G communication standards are connected to the fourth layer 1014. A virtual electric power plant (Virtual Power Plant) and an interdisciplinary data cooperation platform are connected to the first layer 1011. The interdisciplinary data cooperation platform is a system that treats data scattered over different fields of, for example, an automatic operation, an infrastructure, medical care, and the like as big data in a cooperative manner, and that enables data utilization and service offerings across different fields and organizations.

The configuration method of this sort of the network architecture 1000 is able to be implemented by defining, in the cyberspace 1100, the network layer 1021, the local network layer 1022, the first layer 1011, and the second layer 1012, and defining, in the physical space 1200, the grid layer 1023, the physical layer 1024, the lower level layer 1025, the third layer 1013, the fourth layer 1014, and the fifth layer 1015. In addition, the order of the layers to be defined is not particularly limited to the order described above.

This sort of the network architecture 1000 defines the layers having compatibility with each other in the layer structure constituted using the information communication network and the electric power network, so that a cooperative linkage between the networks is enhanced, and thus, strengthen of resilience is improved.

Figure 2:
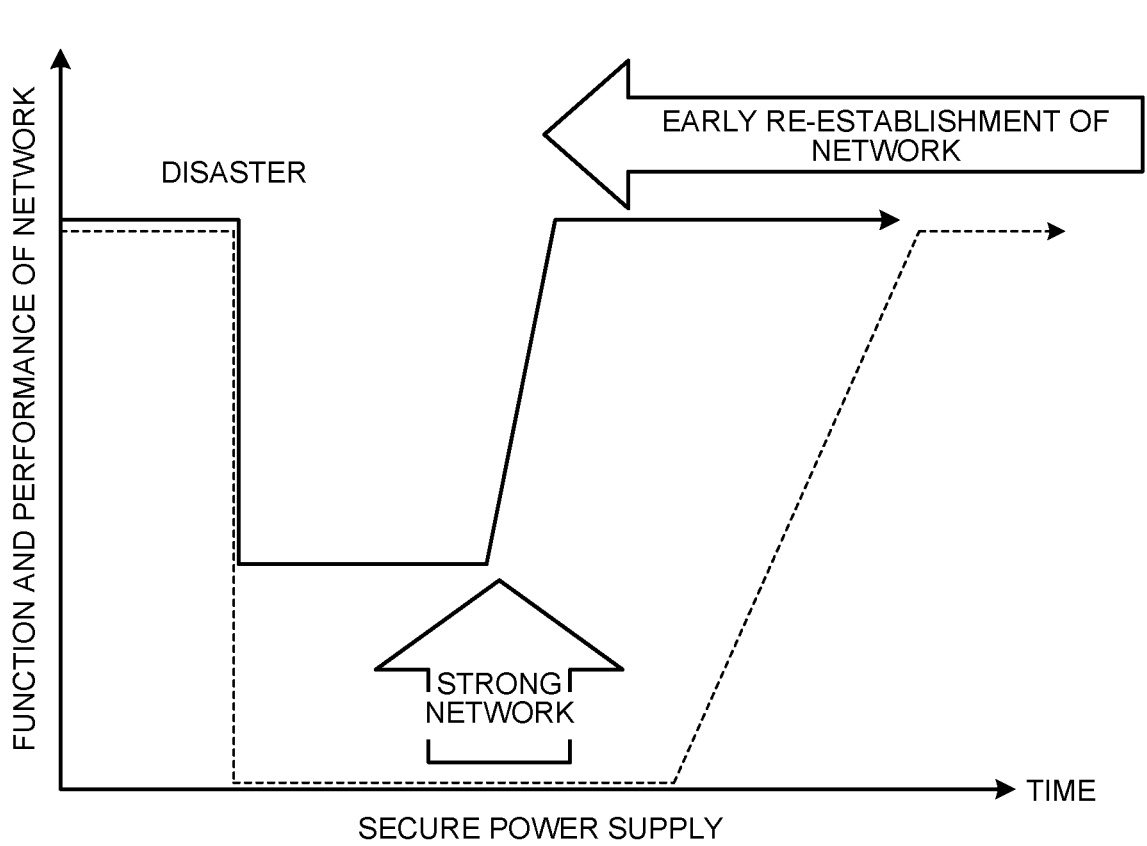
FIG. 2 is a diagram illustrating one example of resilience of a network system.

FIG. 2 is a diagram illustrating one example of resilience of the network system constructed on the basis of the network architecture 1000. In FIG. 2, the horizontal axis indicates time, whereas the vertical axis indicates the function and the performance as the network of the network system. The broken line arrow indicates, as one example, the function and the performance related to the network system that is used before the Great East Japan Earthquake, whereas the solid line arrow indicates the function and the performance related to the network system constructed on the basis of the network architecture 1000.

As indicated by the solid line illustrated in FIG. 2, in the network system constructed on the basis of the network architecture 1000, a plurality of subsystems constituting the system is stopped caused by a breakdown or the like resulting from an occurrence of a disaster, and the function and the performance of the entirety of the system are decreased. However, in the network system, even if the function and the performance are decreased, the entirety of the system is not stopped because the plurality of subsystems are continuously operated as a result of cooperation between the information communication network and the electric power network and autonomous distributed control being performed on both of the network. If the plurality of subsystems that are broken down are repaired or replaced with respect to the plurality of subsystems that is being operated on the basis of the autonomous distributed cooperative control, the repaired or replaced subsystems become assimilated with the running subsystems on the basis of the autonomous distributed cooperative control, and, as a result, the entirety of the system is operated. The autonomous distributed cooperative control is only capable of implementing partial optimization of the system, so that by combining the centralized control, total optimization process is performed on the system when the entirety of the system is operated, an early re-establishment is possible, and resilience is strengthened as a result of an increase in disaster mitigation effect.

Here, resilience is sometimes referred to as, four Rs, that is, elements of Robustness, Redundancy, Resourcefulness, and Rapidity. Robustness corresponds to implementation of an advance measurement, a re-establishment after the fact, and a continuation of business as a result of each of the elements constituting the network having resistance to a disaster. This element is implemented by autonomous control that will be described later. In addition, Redundancy corresponds to a reduction in influence of an external force as a result of the function of the network being distributed instead of being concentrated to a single location. This element is implemented by distributed control that will be described later. In addition, each of Resourcefulness and Rapidity corresponds to an early re-establishment as a reconstruction of the network including the network resources provided from an outside after a disaster. This element is implemented by autonomous distributed cooperative control that will be described later.

<Configuration of Network System>

Figure 3:
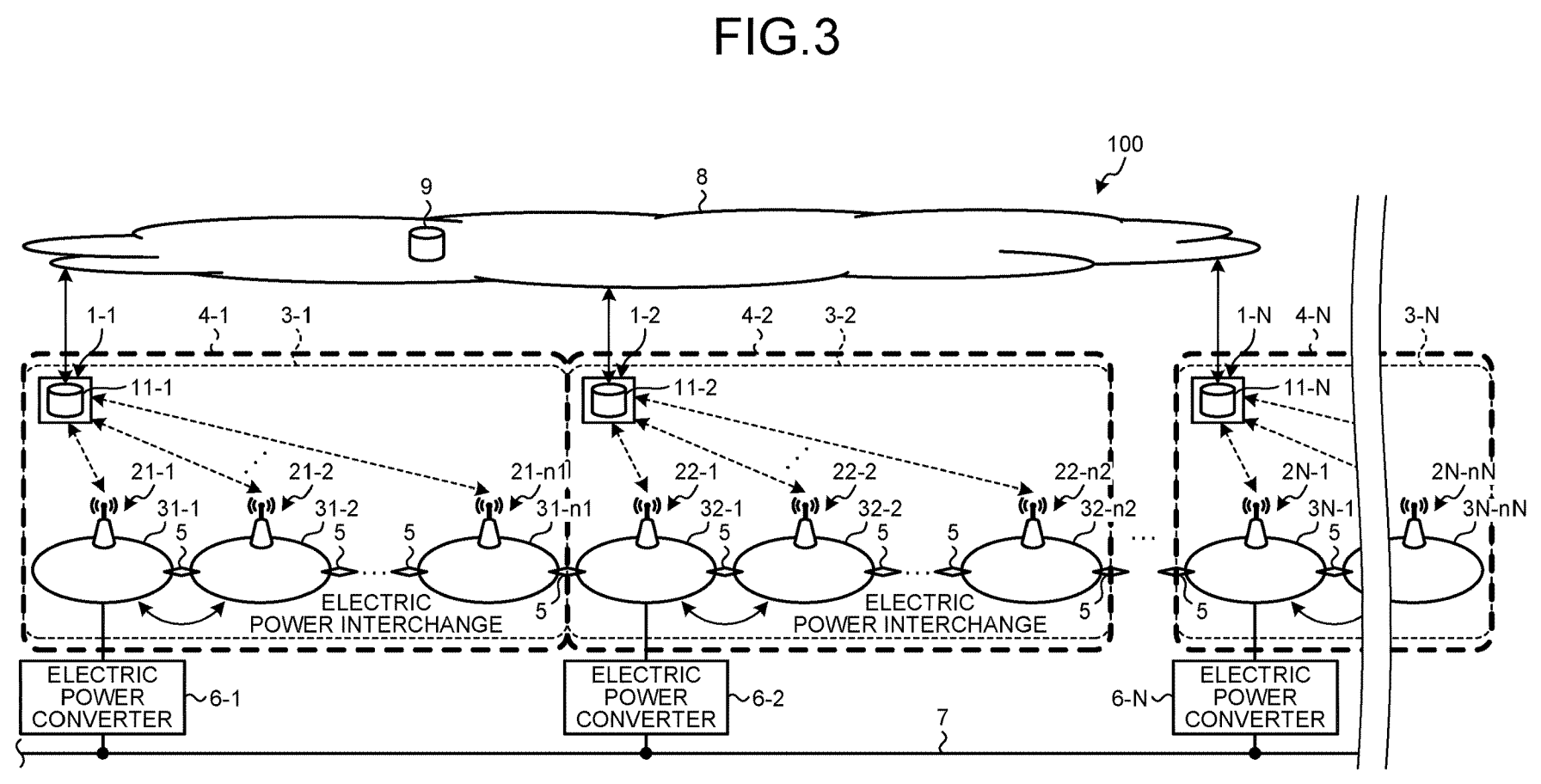

FIG. 3 is a diagram illustrating one example of a configuration of the network system including the network architecture 1000 according to the embodiment. A network system 100 includes wireless base stations 1-1, 1-2, . . . , and 1-N that are a plurality of wireless base stations, distributed antennas 21-1, 21-2, . . . , 21-$n$1, 22-1, 22-2, . . . , 22-$n$2, . . . , 2N-1, . . . , and 2N-nN that are a plurality of distributed antenna, and direct current grids 31-1, 31-2, . . . , 31-$n$1, 32-1, 32-2, . . . , 32-$n$2, . . . , 3N-1, . . . , and 3N-nN that are a plurality of direct current grids. Here, N, n1, n2, . . . and nN are integers larger than or equal to two.

The wireless base stations 1-1, . . . , and 1-N are base stations that are able to perform wireless communication on the basis of the 5G communication standard. Each of the wireless base stations 1-1, . . . , and 1-N has a processing function of a control plane (C-Plane) and a processing function of a user plane (U-Plane) as a wireless base station function; however, in a description below, a configuration related to the processing function of the user plane will be mainly described.

The wireless base stations 1-1, . . . , and 1-N form cells 4-1, 4-2, . . . , and 4-N, respectively, that allow for communication with a wireless terminal on the basis of the 5G communication standard. Each of the cells 4-1, 4-2, . . . , and 4-N is a communication area formed by the associated wireless base stations 1-1, . . . , and 1-N and is also referred to as a macrocell.

Each of the wireless base stations 1-1, . . . , and 1-N includes a centralized unit (CU)/distributed unit (DU) or includes a CU and the MEC server as a configuration example of the MEC. The CU/DU or the CU performs digital signal processing on information that is transmitted and received at the time of communication with a wireless terminal performed in the 5G communication technology. The MEC server will be described later.

In addition, the wireless base stations 1-1, . . . , and 1-N are operated with electric power that is fed from a commercial electric power system and an electric power generating facility that uses regenerated energy, and are also able to be operated with electric power stored in a storage battery that stores the fed electric power. In addition, the electric power stored in the storage battery may be supplied, via an electric power cable, as electric power for operating the distributed antennas 21-1, 21-2, . . . , 21-*n*1, 22-1, 22-2, . . . , 22-*n*2, . . . , 2N-1, . . . , and 2N-nN.

The distributed antennas 21-1, 21-2, . . . , and 21-*n*1 are connected by, for example, an optical fiber cable, to a base band unit (BBU) included in the wireless base station 1-1 that forms the cell 4-1. Each of the distributed antennas 21-1, 21-2, . . . , and 21-*n*1 performs a transmission/reception process on a radio signal that is transmitted or received in 5G wireless communication, and has a function of a radio unit (RU) in 5G wireless communication. It is preferable that the distributed antennas 21-1, 21-2, . . . , and 21-*n*1 are arranged to cover the entirety of the cell 4-1 such that a dead zone is not present. Similarly, the distributed antennas 22-1, 22-2, . . . , 22-*n*2, . . . , 2N-1, . . . , and 2N-nN are connected to the respective wireless base stations 1-2, . . . , and 1-N by, for example, optical fiber cables in the respective cells 4-2, . . . , and 4-N.

For example, the cell covers within a radius of 2 km centered at the wireless base station, and the distributed antenna covers within a radius of 125 m centered at the distributed antenna. However, the numerical values representing these areas are examples and are not limited to these numerical values.

In addition, the base band unit (BBU) function used in 4G is divided into three parts of CU/DU/RU in 5G. Accordingly, RAN virtualization in which the computer resources are able to be more flexibly allocated to the three different network entities is facilitated furthermore. In 5G front haul, each of the functions of the CU/DU/RU is able to be divided in accordance with a RAN architecture, such as C-RAN or D-RAN (for example, Technical report of optical access technologies applying 5G mobile front haul, TR-1079).

Each of the direct current grids 31-1, 31-2, . . . , 31-*n*1, 32-1, 32-2, . . . , 32-*n*2, . . . , 3N-1, . . . , and 3N-nN is arranged in the associated cells 4-1, 4-2, . . . , and 4-N. The direct current grids that are arranged in the same cell are sometimes correctively referred as a direct current grid group. For example, the direct current grids 31-1, 31-2, . . . , and 31-*n*1 are arranged in the cell 4-1, and constitute a direct current grid group 3-1. Similarly, each of the direct current grids 32-1, 32-2, . . . , 32-*n*2, . . . , 3N-1, . . . , and 3N-nN are arranged in the associated cells 4-2, . . . , and 4-N, and constitutes the direct current grid group 3-2, . . . , and 3-N.

Figures 4, 5:
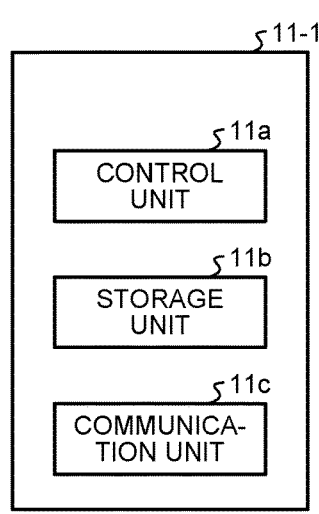
FIG. 4 is a diagram illustrating one example of a configuration of a direct current grid.
FIG. 5 is a diagram illustrating one example of a configuration of a MEC server.

Each of the direct current grids 31-1, 31-2, . . . , 31-*n*1, 32-1, 32-2, . . . , 32-*n*2, . . . , 3N-1, . . . , and 3N-nN has the same configuration as that of the direct current grid 31-1 illustrated in, for example, FIG. 4.

In addition, in FIG. 3, the distributed antennas 21-1, 21-2, . . . , 21-*n*1, 22-1, 22-2, . . . , 22-*n*2, . . . , 2N-1, . . . , and 2N-nN are arranged in an associated manner with the direct current grids 31-1, 31-2, . . . , 31-*n*1, 32-1, 32-2, . . . , 32-*n*2, . . . , 3N-1, . . . , and 3N-nN; however, the direct current grids and the distributed antennas are not particularly arranged in an associated manner. For example, the number of distributed antennas may be larger than the number of direct current grids or may be smaller than the number of direct current grids.

FIG. 4 is a diagram illustrating a configuration of the direct current grid 31-1 as one example of a configuration of the direct current grid. In addition, FIG. 4 illustrates a state in which the direct current grid 31-1 is electrically connected to the adjacent direct current grid 31-2 via an electric power gate 5 that will be described later. The direct current grid 31-1 is constituted by a plurality of electric power elements 10 and an electric power line 20 to which each of the electric power elements 10 is connected. Each of the electric power elements 10 supplies and receives electric power to and from the connected electric power line 20. In addition, the number of the electric power elements 10 is not limited in particular.

Each of the electric power elements 10 is an element that is able to, for example, generate electric power, supply electric power, and consume or charge electric power, and is, for example, a hydrogen station, an electric power generating facility, such as a solar photovoltaic power generation facility, or a wind electric generating facility, using a regenerated energy, an electric power generating device, a storage battery, an EV, a power feeding stand, a net Zero Energy Building (ZEB), or a net Zero Energy House (ZEH), and a data center. In addition, the storage battery is a stationary storage battery or a storage battery that is mounted on an EV. In addition, the EV mentioned here includes a BEV or a PHEV. The EV is one example of a movable electric power element. Furthermore, such an EV is also referred to as a Vehicle to Grid (V2G). In addition, the direct current grid may also supply electric power to the distributed antenna.

The electric power element 10 includes, for example, a detection unit 11, a control unit 12, a storage unit 13, a communication unit 14, and an electric power conversion unit 15, in addition to the element related to electric power generation, a supply of electric power, consumption of electric power, or charging of electric power.

The detection unit 11 measures, on the electric power line 20 side, an electric characteristic value (electric power, electric current, or a voltage) of electric power that is supplied and received by way of the electric power line 20. The detection unit 11 is able to be implemented by using, for example, a smart meter.

The control unit 12 is a unit that performs various kinds of arithmetic processing for implementing the function of the electric power element 10, and is constituted by including, for example, a processor, such as a central processing unit (CPU), an application specific integrated circuit (ASIC), a field-programmable gate array (FPGA), a digital signal processor (DSP), or a graphics processing unit (GPU). The function of the control unit 12 is implemented as a result of the control unit 12 reading various kinds of programs from the storage unit 13.

The storage unit 13 includes, for example, a read only memory (ROM) in which various kinds of programs, data, and the like that are used by the control unit 12 to perform the arithmetic processing. In addition, the storage unit 13 may also include, for example, a random access memory (RAM) that is used as a working space that is used at the time of arithmetic processing performed by the control unit 12, and that is used to store the result of the arithmetic processing obtained by the control unit 12, the measurement result obtained by the detection unit 11, and the like. The storage unit 13 may also include an auxiliary storage device, such as a hard disk drive (HDD), a solid state drive (SSD), or the like.

The communication unit 14 is constituted by including a communication module that performs wireless communication on the basis of the 5G communication standard. The communication unit 14 communicates with the wireless base station 1-1 via the distributed antenna 21-1 in a case of the distributed antenna associated with the connected direct current grid, that is, the direct current grid 31-1. The communication unit 14 is one example of a wireless terminal.

For example, the communication unit 14 transmits, to the wireless base station 1-1, information related to a state of electric power in the electric power element 10, for example, information on an electric power generation capacity, an electric power generation state, an electric power storage capacity, an electric power storage state, or an electric power load, and information on the electric characteristic value measured by the detection unit 11.

The electric power conversion unit 15 converts the electric power that is supplied and received by the electric power element 10. The electric power conversion unit 15 is, for example, a DC/DC converter.

A description will be given here by referring back to FIG. 3. The network system 100 further includes a plurality of the electric power gates 5. Each of the electric power gates 5 is arranged between the adjacent direct current grids, and has a function for adjusting an amount and a direction of the passing electric power in order to interchange the electric power among the direct current grids. Each of the electric power gates 5 is not only arranged between the direct current grids that are adjacent within the same direct current grid group included in the same cell, but also arranged between the adjacent direct current grids each of which is arranged in a different cell and is included in a different direct current grid group. For example, the electric power gate 5 that is disposed between the direct current grid **31-*n*1 and the direct current grid 32-1 is one example of the electric power gate that is disposed between the adjacent direct current grids each of which is arranged in a different cell and is included in a different direct current grid group. Each of the electric power gates 5 is able to be constituted by using an electric power converter with a type of, for example, a self-excited type or the like that converts electric power in a bidirectional manner. In addition, each of the electric power gates 5** has a function used in 5G wireless communication, also functions as a wireless terminal, and communicates with the MEC server, which will be described later, via the distributed antenna.

In this way, the direct current grid groups 3-1, 3-2, . . . , and 3-N, and the electric power gates 5 form a direct-current electric power network. Each of the direct current grid groups 3-1, 3-2, . . . , and 3-N is one example of the electric power local network.

In addition, in the present embodiment, the direct current grid 31-1 is connected to an electric power transmission line 7 provided for a commercial electric power system via an electric power converter 6-1 that performs AC/DC conversion, and is able to supply electric power. Similarly, each of the direct current grids 32-1, . . . , and 3N-1 is connected to the electric power transmission line 7 in the electric power system via electric power converters 6-2, . . . , and 6-N, respectively, each of which performs AC/DC conversion, and is able to supply electric power. Therefore, in the network system 100, an electric power network that includes the electric power system and the direct current electric power network that is constituted by the direct current grid groups 3-1, 3-2, . . . , and 3-N is constructed. In addition, in the network system 100, each of the direct current grid groups 3-1, 3-2, . . . , and 3-N is connected to the electric power transmission line 7 included in the electric power system; however, only one of the direct current grid groups may be connected to the electric power transmission line 7. The direct current grid to which the electric power transmission line 7 is connected is also referred to as an on-grid, whereas the direct current grid to which the electric power transmission line 7 is not connected is also referred to as an off-grid.

The network system 100 further includes MEC servers 11-1, 11-2, . . . , and 11-N that are disposed in the wireless base stations 1-1, 1-2, . . . , and 1-N, respectively, and includes a data center 9 that is disposed in cloud computing 8 that provides various services via a network, such as the Internet. Each of the MEC servers 11-1, 11-2, . . . , and 11-N has the same configuration as that of the MEC server 11-1 illustrated in, for example, FIG. 5.

FIG. 5 is a diagram illustrating a configuration of the MEC server 11-1 as one example of the configuration of the MEC server. The MEC server 11-1 includes a control unit 11*a*, a storage unit 11*b*, and a communication unit 11*c*.

The control unit 11*a* performs various kinds of arithmetic processing for implementing the function of the MEC server 11-1, and is constituted by including a processor. The function of the control unit 11*a* is implemented by reading and executing various kinds of programs from the storage unit 11*b* by the control unit 11*a*.

The storage unit 11*b* includes, for example, a ROM that stores therein various kinds of programs, data, and the like that are used by the control unit 11*a* to perform arithmetic processing. In addition, the storage unit 11*b* includes, for example, a RAM that is used as working space at the time of arithmetic processing performed by the control unit 11*a* and that is used to store therein the result of the arithmetic processing obtained by the control unit 11*a*. The storage unit 11*b* may also include an auxiliary storage device.

The communication unit 11*c* is constituted by including a communication module that performs communication in a wireless and wired manner. The communication unit 11*c* communicates with the electric power elements included in the direct current grids 31-1, 31-2, . . . , and **31-*n*1 via the distributed antennas 21-1, 21-2, . . . , and 21-*n*1, respectively, included in the cell 4-1 formed by the wireless base station 1-1**.

The data center 9 includes, similarly to the MEC server, a control unit, a storage unit, and a communication unit. The control unit performs various kinds of arithmetic processing in order to implement the function of the data center 9. The storage unit stores therein various kinds of information in order to implement the function of the data center 9. The communication unit communicates with the wireless base stations 1-1, 1-2, , and 1-N via the cloud computing 8 by using, for example, a communication cable. The configuration of each of the control unit, the storage unit, and the communication unit is the same as that of the MEC server; therefore, descriptions thereof will be omitted.

As described above, in the network system 100, the information communication network performed based on the 5G wireless communication technology is constituted by the wireless base stations 1-1, 1-2, , and 1-N and the distributed antennas 21-1, 21-2, . . . , **21-*n*1, 22-1, 22-2, . . . , 22-*n*2, . . . , 2N-1, . . . , and 2N-nN. Furthermore, in the network system 100, in addition to the information communication network performed based on the wireless communication described above, a broader information communication network in which the cloud computing 8 and the data center 9 are additionally included is constructed. In addition, as described above, in the network system 100, the electric power network that includes both of the electric power system and the direct current electric power network constituted by the direct current grid groups 3-1, 3-2, . . . , and 3-N is constructed. Therefore, the network system 100** is constructed such that the information communication network and the electric power network are integrated.

<Control Method>

In the following, one example of a control method used in the network system 100 will be described.

In the present embodiment, each of the MEC servers 11-1, 11-2, . . . , and 11-N may control the electric power gate 5 such that electric power is interchanged between the plurality of direct current grids that are present closer to each other on the basis of the information acquired from each of the different MEC servers. This sort of control that is performed such that electric power is interchanged among the plurality of direct current grids that are present closer to each other is one example of autonomous distributed cooperative control. Information shared among the MEC server is performed within a sufficient narrow range that is acceptable to a communication delay between, for example, the MEC servers that are located in the neighborhood, so that it is possible to share the information in a relative low delay. Therefore, an existence range of the direct current grids that are present closer to each other may be set as needed in accordance with a degree of, for example, a communication delay.

An operation of each of the electric power elements 10 is controlled by the EMS that is define by the grid layer 1023 included in the network architecture 1000. A hardware configuration of the EMS may be constituted by using the same configuration as that of the MEC server. The EMS is disposed, for example, in an associated manner with each of the direct current grids. The EMS holds, in advance, control information in which a rule that is used for the autonomous distributed cooperative control is defined in the storage unit, and controls an operation of each of the electric power elements 10 in accordance with the rule. For example, the rule that is indicated by the control information with respect to each of the electric power elements 10 is defined such that smoothing of electric power in each of the direct current grids 31-1, 31-2, . . . , 31-$n$1, 32-1, 32-2, . . . , 32-$n$2, . . . , 3N-1, . . . , and 3N-nN is performed in accordance with a receipt state of electric power with respect to each of the electric power elements 10. In each of the direct current grids 31-1, 31-2, . . . , 31-$n$1, 32-1, 32-2, . . . , 32-$n$2, . . . , 3N-1, . . . , and 3N-nN, the autonomous distributed cooperative control is performed in accordance with this rule. In each of the direct current grids 31-1, 31-2, . . . , 31-$n$1, 32-1, 32-2, . . . , 32-$n$2, . . . , 3N-1, . . . , and 3N-nN, an electric power situation (an electric power generation capacity, an electric power generation state, an electric power storage capacity, an electric power storage state, or an electric power load) or an electric characteristic value varies from hour to hour; however, by performing the autonomous distributed cooperative control described above is performed on each of the direct current grids 31-1, 31-2, . . . , and 31-$n$1, it is possible to cancel out the variations and implement electric power smoothing, so that it is possible to improve stabilization of electric power supply and demand in each of the direct current grids 31-1, 31-2, . . . , 31-$n$1, 32-1, 32-2, . . . , 32-$n$2, . . . , 3N-1, . . . , and 3N-nN. In addition, for example, various control methods including, for example, feedback control may be applied to the control method used in each of the direct current grids 31-1, 31-2, . . . , 31-$n$1, 32-1, 32-2, . . . , 32-$n$2, . . . , 3N-1, . . . , and 3N-nN. In addition, the EMS acquires information that is needed for the autonomous distributed cooperative control from each of the electric power elements 10 via the MEC server. In addition, the EMS may be configured so as to be able to perform centralized control, which will be described later, in addition to the autonomous distributed cooperative control.

In addition, the rule about the control of each of the electric power elements 10 is able to be updated from outside of the EMS. The update is an update performed on the rule that is suitable for smoothing electric power in the associated electric power grid performed on the basis of, for example, information on an electric power generation capacity, an electric power generation state, an electric power storage capacity, an electric power storage state, or an electric power load transmitted from each of the electric power elements 10 or the like, and information on the electric characteristic value measured by the detection unit 11.

In addition, in the present embodiment, on the basis of the information acquired from the electric power elements 10 that are included in the respective direct current grids via the respective distributed antennas included in the respective cells, the EMS performs a step of control such that electric power is interchanged between the direct current grids that are arranged in the associated cell. This sort of control is one example of the autonomous distributed cooperative control. In other words, the EMS is able to perform control of the electric power interchange between the adjacent grids.

For example, in the case where an electric power shortage occurs in a certain direct current grid that is arranged in a certain cell, the EMS in the direct current grid in the associated cell performs control of the electric power gate 5 in order to interchange electric power from another direct current grid that has electric power to spare. For example, in the case where a shortage of electric power occurs in the direct current grid 31-1 arranged in the cell 4-1, if electric power is in surplus in the direct current grid 31-2 that is arranged in the same cell 4-1, electric power is interchanged from the direct current grid 31-2 to the direct current grid 31-1 as a result of the associated EMS controlling the electric power gate 5 included in the cell 4-1. The EMS specifies the direct current grid that is short of electric power and the direct current grid that has electric power to spare on the basis of the acquired information on, for example, an electric characteristic value of each of the electric power grids or the like. Then, the EMS controls the electric power gate 5 such that electric power is interchanged between the specified direct current grids. In addition, in the case where the direct current grid that is short of electric power and the direct current grid that has electric power to spare are not adjacent with each other, the EMS controls the electric power gate 5 such that electric power is interchanged by way of the direct current grid and the electric power gate 5 that are present between the two direct current grids.

In addition, in the present embodiment, on the basis of the information acquired from the plurality of MEC servers, the data center 9 performs a step of control such that electric power is interchanged between the direct current grids that are arranged in different cells. This sort of control is also referred to as centralized control. For example, in the case where an electric power shortage occurs in a direct current grid that is arranged in a certain cell and an interchange of electric power is not able to be performed within a direct current grid group in which the subject direct current grid is included, if electric power is in surplus in another direct current grid group that is arranged in another cell, the data center 9 performs control such that electric power is interchanged from the direct current grid group that has electric power to spare to the direct current grid group that is short of electric power.

In other words, if a balance between electric power supply and demand exceeds a certain limit, smoothing control (autonomous distributed cooperative control) of electric power supply and demand in a certain direct current grid group or between the direct current grid groups that are located closer to each other does not sometimes effectively function. For example, if an amount of variation in electric power supply and demand exceeds an amount of generated electric power, an amount of electric power consumption, an amount of variation in electric power load, or the like that is adjustable in the direct current grid group or between the direct current grid groups located closer to each other, the autonomous distributed cooperative control does not sometimes effectively function. If the data center 9 determines that the autonomous distributed cooperative control does not effectively function, the control is switched from the autonomous distributed cooperative control that is performed by the MEC server to centralized control that is performed by the data center 9 such that electric power is interchanged between the direct current grid groups or between a combination of the plurality of direct current grid groups that are present closer to each other and the direct current grid group other than these direct current grid groups.

The data center 9 receives information related to a balance between supply and demand of the electric power transmitted from, for example, each of the MEC servers, associates the received information with identification information on each of the MEC servers, and then updates the database stored in the storage unit. The database contains the identification information on each of the MEC servers, information on a balance between supply and demand, and information on a supply and demand situation. The balance between supply and demand is represented by a percentage obtained such that a fulfillment percentage of electric power is defined as 100% in the case where, for example, a balance between supply and demand meets a criterion. The supply and demand situation is indicated as "favorable" in the case where, for example, the fulfillment percentage is equal to or larger than 100%, and is indicated as "shortage" in the case where, for example, the fulfillment percentage is less than 100%.

For example, in the case where an electric power shortage occurs in a certain direct current grid included in the direct current grid group 3-1 that is arranged in the cell 4-1, if another direct current grid included in the direct current grid group 3-1 does not have electric power to spare, the MEC server 11-1 generates information indicating that the fulfillment percentage is a predetermined value that is less than 100% as information related to an electric power interchange between the direct current grids that are included in the direct current grid group 3-1, and then transmits the generated information to the data center 9. In contrast, in the case where, regarding the other cell, for example, the cell 4-2, the direct current grid group 3-2 that is arranged in the cell 4-2 has electric power to spare, the MEC server 11-2 generates information indicating that the fulfillment percentage is a predetermined value that is equal to or larger than 100% as the information related to the electric power interchange, and then transmits the generated information to the data center 9. In addition, such a fulfillment percentage may be defined as a value representing the plurality of direct current grid groups that are present closer to each other.

Here, the information related to the electric power interchange need not always include information that specifically indicates which of the direct current grid is short of electric power or which of the direct current grid has electric power to spare, and, in some cases, the information related to the electric power interchange may include information that indicates which cell (direct current grid group) is short of electric power or which cell has electric power to spare.

The data center 9 acquires information related to the electric power interchange from each of the MEC servers 11-1, . . . , and 11-N. Then, the data center 9 transmits a command (command about an electric power interchange) to control the electric power gate 5 in order to interchange electric power, on the basis of the control information that is stored in the storage unit in advance and in which the rule for the centralized control is defined, from the direct current grid group that is able to interchange electric power to the other direct current grid from among the MEC servers 11-1, . . . , and 11-N to the MEC server that is involved in a case in which electric power is interchanged to a group of the direct current grid group that is short of electric power or a group of the electric power grid group that is located nearby. Then, each of the MEC servers that receives the command appropriately controls the electric power gate that is to be controlled by the own MEC server. In addition, regarding a specific method of controlling the electric power gate 5 and forming a path that is used to interchange electric power, a path is formed as a result of control of the electric power gate 5 performed on the basis of the control information that is stored in the storage unit included in each of the MEC servers in advance and in which the rule for the electric power interchange is defined. In addition, the rule that is held by each of the MEC servers is also able to be updated by the data center 9. In this case, the data center 9 generates the control information in which the more appropriate rule is defined on the basis of the information transmitted from the MEC server, transmits the generated information to each of the MEC servers, and then updates the rule. Consequently, electric power is interchanged between the direct current grid groups, or between a combination of each of the plurality of direct current grid groups that are present closer to each other and the direct current grid group other than these direct current grid groups.

In this way, the data center 9 performs centralized control such that electric power is interchanged between the direct current grid groups or between a combination of each of the plurality of direct current grid groups that are present closer to each other and the other electric power local network, whereby total optimization of electric power in the cells 4-2, . . . , and 4-N is performed.

In the network system 100 configured as described above, the electric power network and the information communication network are more highly integrated, and, in addition, an electric power interchange is possible in the cell and an electric power interchange is also possible between the cells. As a result, even if electric power is locally short caused by, for example, a disaster, it is possible to implement an early recovery due to the electric power interchange, and, in addition, it is possible to prevent a local electric power shortage from affecting in a wide area for a long period. In addition, the information communication network is also recovered early as a result of the early recovery of electric power. In addition, the electric power network is also recovered early as a result of the recovery of the information communication network. As a result, the network system 100 is constituted such that a cooperative linkage between the information communication network and the electric power network is enhanced and strengthen of resilience has been improved.

In addition, in the network system 100, it is possible to perform efficient control by switching between the autonomous distributed cooperative control and the centralized control.

In addition, in the network system 100, the MEC servers and the data center are able to interchange electric power such that electric power is supplied, by the EMS, to the electric power element included in the direct current grid included in the cell in which a failure occurs in wireless communication caused by a shortage of electric power, and are able to perform control such that the failure of the wireless communication is recovered by interchanging the electric power. As a result, the recovery of the information communication network is more quickly implemented as a result of the recovery of the electric power network.

In addition, in the network system 100, the wireless terminal that corresponds to the electric power element and the MEC server perform communication on the basis of the 5G communication standard in which communication delay time is guaranteed, so that it is possible to quickly perform smoothing of electric power by performing autonomous distributed cooperative control by the MEC server, and it is thus possible to prevent an electric power shortage or immediately recover from an electric power shortage.

In addition, the network system 100 includes a movable electric power element, such as an EV, so that it is also possible to interchange electric power to a nearby direct current grid and a nearby direct current grid group by moving the EV. Furthermore, a cell and a second cell are arranged at a relatively short distance, so that the EV is able to move between the cells within a relatively short time and is able to interchange electric power.

Furthermore, with the autonomous distributed cooperative control or the centralized control described above, the MEC servers and the data center interchange electric power between the direct current grids, and may also control an electric power converter that is connected to the electric power transmission line 7 such that electric power is supplied from the electric power system.

<One Example of Flow of Control>

One example of a control method performed by the network system 100 will be described. However, the control method is not limited to this.

First, at Step S101, control of each of the electric power elements 10 is performed in accordance with an operation rule of the EMS (electric power smoothing in the own grid). In addition, in the direct current grid group (direct current grid group in the same cell), an electric power situation of each of the direct current grids collected by the MEC server is distributed to the EMS that is included in each of the direct current grids. In accordance with the electric power situation of the adjacent direct current grid, the EMS in each of the direct current grids is subjected to autonomous distributed cooperative control (electric power interchange between the grids included in the same cell) in accordance with the rule in which an operation of smoothing the electric power situation of each of the direct current grids is defined.

Subsequently, at Step S102, the data center 9 monitors the electric power situation of each of the direct current grid groups collected from the associated MEC servers, and determines whether or not a direct current grid group in which the electric power situation meets a predetermined centralized control condition is present. If the direct current grid group that meets the centralized control condition is not present, the process proceeds to Step S101. If the direct current grid group that meets the centralized control condition is present, the process proceeds to Step S103. In addition, the monitoring and determination processes may be performed by the EMS.

Subsequently, at Step S103, the data center 9 performs centralized control for interchanging electric power between the direct current grid groups. In addition, as one example, the MEC server may perform control for receiving an electric power supply from the electric power system. In addition, the control may be performed by the EMS.

Subsequently, at Step S104, the data center 9 determines whether or not the electric power situation of the direct current grid group that corresponds to the centralized control condition has been recovered. For example, if the electric power situation does not correspond to the centralized control condition any more, the data center 9 determines that the electric power situation has been recovered. If the electric power situation has been recovered, a cooperation instruction between the centralized control and the electric power system is canceled, and the process proceeds to Step S101. In contrast, if the electric power situation is not recovered, the process proceeds to Step S105. For example, if a failure occurs in the electric power system caused by a natural disaster or the like, in some cases, the process proceeds to Step S105 in a state in which electric power situation is not recovered.

Subsequently, at Step S105, the data center 9 performs control, on the basis of the predetermined rule, such that a power supply of the electric power element included in the target direct current grid is turned off. As a modification, instead of turning off the power supply, an amount of electric power to be supplied may be decreased or a mode is switched to an electrical power saving mode. In addition, in the case where a failure occurs in a wireless environment, the data center 9 allows the communication network to be recovered by instructing the MEC server included in the target wireless base station and the MEC server that is located in the vicinity of the subject wireless base station to form an ad hoc network. If the process at Step S105 has been completed, the process proceeds to Step S101. If the process proceeds to Step S101, the autonomous distributed cooperative control is performed under the power supply control of the electric power element and the communication environment that is after the recovery, and electric power and the communication environment are continuously provided by using the remaining surviving electric power elements. In addition, in this example, the autonomous distributed cooperative control is performed in units of direct current grid groups; however, the same method is also used in the case where the autonomous distributed cooperative control is performed in units of plurality of direct current grid groups that are present nearby.

By performing the autonomous distributed cooperative control on a priority basis, local production and consumption of electric power is implemented, and, in addition, as a result of smoothing control of electric power being autonomously performed in units of electric power elements, in units of grids, in units of grid groups (in units of jurisdictions of MEC servers), or in units of plurality of direct current grid groups that are present nearby, even if a failure occurs in some of them, it is possible to continue the control by minimizing the influence caused by the failure. Furthermore, at the time of a disaster or the like, it is possible to provide electric power and a communication environment as much as possible by using the remaining elements that are not damaged. In addition, even if a failure occurs in a communication infrastructure, by restoring the communication network environment by constructing an ad hoc network in accordance with an instruction from the data center 9, it is possible to contribute to a prompt re-establishment needed to recover a supply of the electric power provided, on the basis of the above described autonomous distributed cooperative control, to at least a part of region associated with the restored portion.

Furthermore, the present disclosure is not limited to the embodiment described above. The present disclosure also includes those formed by combining components of the embodiment as appropriate. In addition, further effects and modifications will readily occur to those skilled in the art. Therefore, wider aspects of the present disclosure are not limited to the embodiment described above, and various modifications may be made.

For example, in the 5G mobile communication system, if adjacent macrocells are overlapped, there is a risk of occurrence of inter-cell radio wave interference in an overlapping area. In order to prevent such inter-cell radio wave interference, there is a technology of adjusting the intensity of a radio wave by working adjacent wireless base stations in cooperation with each other. This technology may be referred to as autonomous distributed cooperative control. If this technology is used, for example, in the case where a function of a certain wireless base station is decreased due to a disaster, a wireless base station that is adjacent to the certain wireless base station increases the radio wave intensity and covers, to some extent, a communication area in which the wireless base station whose function has been decreased or lost is present, so that it is possible to operate the entirety of the system. Therefore, by applying this sort of technology to the network system 100 according to the embodiment, the autonomous distributed cooperative control that has been defined in the local grid layer in the electric power network may be defined in the second layer in the information communication network and then may be applied to the third layer.

According to the present disclosure, in a network system, a network architecture in which an electric power network and an information communication network are defined in physical space and cyberspace includes, in the cyberspace, a network layer that defines the entirety of the electric power network that is constituted from a plurality of electric power grids; in the cyberspace, a local network layer that defines a local network that corresponds to a plurality of electric power grid groups and that forms a part of the electric power network; in the physical space, a grid layer that defines the electric power grids; in the physical space, a physical layer that defines constituent elements included in the electric power grids; in the cyberspace, a first layer that defines the information communication network in an associated manner with the network layer; in the cyberspace, a second layer that defines the information communication network in an associated manner with the local network layer; in the physical space, a third layer that defines the information communication network in an associated manner with the grid layer; and in the physical space, a fourth layer that defines the information communication network in an associated manner with the physical layer. As a result, the electric power network and the information communication network are more highly integrated in a layer-by-layer manner, so that cooperative linkage between the networks is enhanced, and it is thus possible to implement a network system in which strengthen of resilience has been improved.

Although the disclosure has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system comprising
a network architecture in which an information communication network and an electric power network are defined in physical space and cyberspace, wherein
the network architecture includes:
in the cyberspace, a network layer configured to define an entirety of the electric power network that is constituted from a plurality of electric power grids;
in the cyberspace, a local network layer configured to define a local network that corresponds to a plurality of electric power grid groups and that forms a part of the electric power network;
in the physical space, a grid layer configured to define the electric power grids;
in the physical space, a physical layer configured to define constituent elements included in the electric power grids;
in the cyberspace, a first layer configured to define the information communication network that is associated with the network layer;
in the cyberspace, a second layer configured to define the information communication network that is associated with the local network layer;
in the physical space, a third layer configured to define the information communication network that is associated with the grid layer; and
in the physical space, a fourth layer configured to define the information communication network that is associated with the physical layer.

2. The network system according to claim 1, wherein the local network layer is configured to define autonomous distributed cooperative control related to supply and demand or an interchange of electric power.

3. The network system according to claim 1, wherein the network layer is configured to define centralized control related to supply and demand or interchange of electric power.

4. The network system according to claim 1, wherein the grid layer is configured to define at least one of a topology of the electric power grids, connections between electric power lines and electric power elements constituting the electric power grids, an energy management system for the electric power grids, cooperation with an electric power system, and a connection between the electric power grids.

5. The network system according to claim 1, wherein the physical layer is configured to
define a function or performance of at least one of an electric power generating device or an electric power storage device serving as an electric power element constituting the electric power grid, an electric power converter, and a direct current base line, or
define a connection between an electric power grid and the electric power system.

6. The network system according to claim 1, wherein the first layer is configured to define cloud computing including a cloud server.

7. The network system according to claim 1, wherein the second layer is configured to define a function of each of mobile edge computing (MEC) and a wireless base station.

8. The network system according to claim 1, wherein the third layer is configured to define:
a wireless base station and a distributed antenna including mobile edge computing (MEC) constituting the information communication network; and
a topology of the electric power elements.

9. The network system according to claim 1, wherein the fourth layer is configured to define a physical radio access network (RAN) configuration including an electromagnetic wave environment in the information communication network.

10. A configuration method of a network architecture in which an electric power network and an information communication network are defined in physical space and cyberspace and in which electric power is integrated with a network of information communication, the configuration method of the network architecture comprising:

defining, in the cyberspace, a network layer configured to define an entirety of the electric power network that is constituted from a plurality of electric power grids;

defining, in the cyberspace, a local network layer configured to define a local network that corresponds to a plurality of electric power grid groups and that forms a part of the electric power network;

defining, in the physical space, a grid layer configured to define the electric power grids;

defining, in the physical space, a physical layer configured to define constituent elements included in the electric power grids;

defining, in the cyberspace, a first layer configured to define the information communication network in an associated manner with the network layer;

defining, in the cyberspace, a second layer configured to define the information communication network in an associated manner with the local network layer;

defining, in the physical space, a third layer configured to define the information communication network in an associated manner with the grid layer; and defining, in the physical space, a fourth layer configured to define the information communication network in an associated manner with the physical layer.

* * * * *